April 7, 1936.  F. W. LE PORIN  2,036,586
CLUTCH
Filed Oct. 17, 1934

INVENTOR.
FREDERIC W. LE PORIN,
BY
ATTORNEY

Patented Apr. 7, 1936

2,036,586

UNITED STATES PATENT OFFICE 2,036,586

CLUTCH

Frederic W. Le Porin, Brooklyn, N. Y.

Application October 17, 1934, Serial No. 748,598

2 Claims. (Cl. 192—43)

This invention relates to clutches of the type in which the clutch-parts operate to automatically engage and disengage with the starting and declining of a driving force (the driving force of an electric motor, for example) and provides improvements therein.

The invention provides an improved clutch of the type described, in which the action upon the starting of the driving force, is to automatically effect a quick and firm engagement of the clutch-parts; and also in which the action is to automatically and quickly release the firm engagement of the clutch-parts when the driving force declines. The invention further provides a simple and durable clutch structure for accomplishing the aforesaid function.

An embodiment of the invention is illustrated in the accompanying drawing, wherein.

Figure 1:
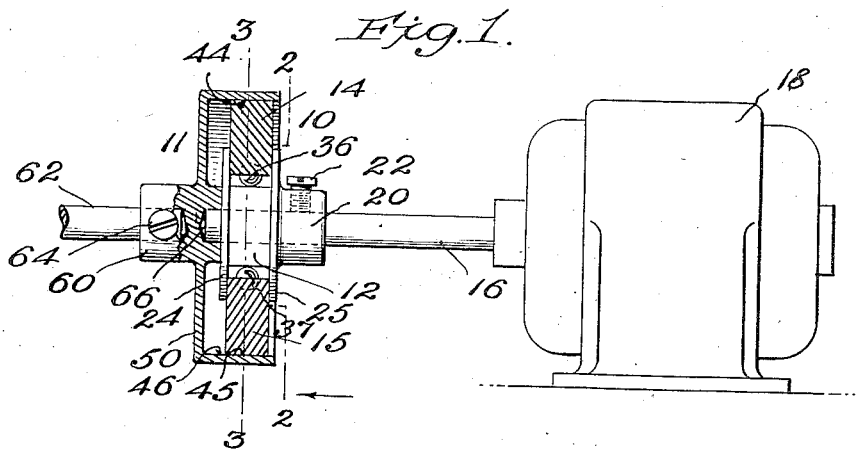
Fig. 1 is a view of the clutch applied to a shaft, in two parts, one part being the driving-shaft of an electric motor, the clutch being shown in vertical section.
Figures 2, 3:
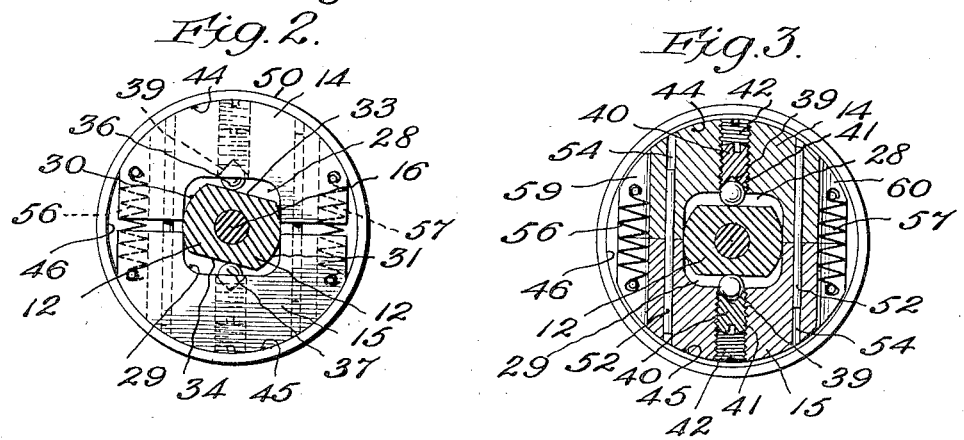
Fig. 2 is a view in section on the line 2—2, Fig. 1, the parts of the clutch being shown in engaging position.
Fig. 3 is a view in section on the line 3—3, Fig. 1, the clutch parts being shown in disengaging position.
Figures 4, 6:
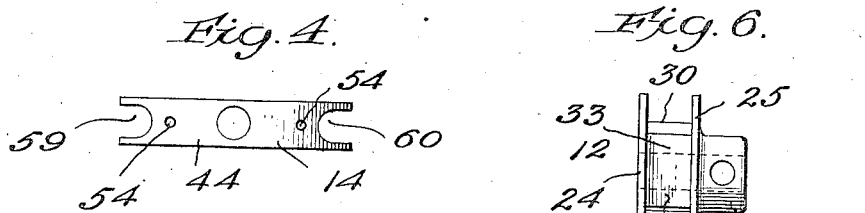
Figs. 4 and 5 are respectively a top plan view and a side elevation of one of the segments.
Fig. 6 is a top plan view of the cam.
Figure 5:
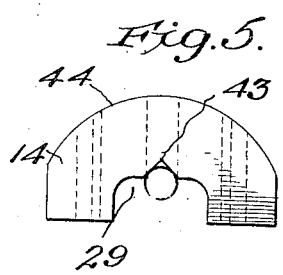

Referring to said drawing, numeral 10 designates the driving part of the clutch and 11 the driven part. The driving part 10 comprises a cam 12, and opposite segments 14 and 15, and is connected to a driving shaft 16, which latter is shown as the shaft of an electric motor 18. The cam 12 is conveniently formed with a solid hub 20 which fits on the driving shaft 16, and may be fixed thereto by a set-screw 22. The cam 12 acts on the segments 14, 15, and for maintaining the segments in position with reference to the cam, flanges 24, 25 arranged to bear on the sides of the segments are provided, the flanges 24, 25 being conveniently formed as lateral flanges on the sides of the cam 12, and the segments being formed with flat sides fitting alongside the inside faces of the flanges. With two segments 14, 15, as shown, the segments are formed with recesses 28, 29, and the cam is provided with arcuate faces 30, 31 which bear on the segments inside the recesses 28, 29 and thereby keep the segments centered. The cam 12 is preferably provided with opposite, parallel, flat cam faces 33, 34, which are simply formed and provide a quick rise of the cam-surface with a short angular movement of the cam. The segments are provided with projections 36, 37 which bear on the cam-faces 33, 34. These projections are preferably anti-friction devices such as balls, as shown in Figs. 1–3, or rollers, as shown in Fig. 5, and the segments are countersunk, as indicated at 39, to provide seats for the balls and to keep them in position. The seats 39 are preferably formed in screw-plugs 40 which fit in threaded-sockets 41 in the segments, and locking-screws 42 may be provided for locking the plugs 40 in the sockets. These screw-plugs 40 may be adjusted toward and from the cam-faces 33, 34 and thereby an equal engaging action of the segments obtained, as hereinafter more fully described. When a roller is employed, as shown in Fig. 5, a notch 43 may be cut across the segment to provide a seat therefor.

Interengaging means are provided on the driving and driven parts 10, 11 of the clutch. These means are preferably of the friction-type, and comprise cylindrical portions 44, 45 on the outer faces of the segments and a cylindrical portion 46 on the inside of a drum 50 forming part of the driven-part 11 of the clutch.

The cam 12 has a small angular movement with respect to the segments 14, 15, and in this angular movement the cam-faces 33, 34 acting on the projections 36, 37 move the segments diametrally to force the cylindrical portions 44, 45 thereof into frictional engagement with the cylindrical portion 46 of the driven-part 11. Means are provided for guiding the segments 14, 15, in their diametral movements, and such means may be in the form of pins 52 seated in one segment 14, 15, and holes 54 in the opposite segment in which the pins slide.

The segments 14, 15 are acted on by spring-means in a direction to draw them together. Springs 56, 57 are attached to the segments at opposite sides of the cam, the ends of the springs being attached to opposite segments and the segments are preferably provided at their ends with grooves 59, 60 for housing the springs.

The driven part 11 of the clutch comprises the drum 50 having the interengaging portion 46, as heretofore described, and is also preferably provided with a hub 60 which receives the end of a driven shaft 62 and to which it may be fixed by means of a set-screw 64. The hub 60 is also preferably provided with a seat 66 for receiving, alining, and steadying the end of the driving-shaft 16.

Operation

Upon the starting of a driving force, as for example the energization of electric motor 18 by the closing of a switch, the motor and shaft 16 initially start free. Almost instantly the cam 12 acts to move the segments 14, 15 outwardly to engage the cylindrical portions 44, 45 of the segments with the cylindrical portion 46 of the driven part 11 of the clutch. The segments 14, 15, while free to turn, oppose an opposite torque to the driving torque imparted to cam 12, due to the inertia of the segments, and hence the action of the cam is to force the segments outwardly against the force of the springs 56, 57. The centrifugal force developed in the segments, as they turn also assists in the outward movement of the segments, and by regulating the force of the springs 56, 57 with reference to the centrifugal force, the time required for the segments to engage the portion 46 of the driven part 11, may be varied. After contact is made between the segments 14, 15 and the portion 46 of the driven-part 11, the load on the driven part of the clutch creates a torque opposite to the torque transmitted by the driving-shaft to cam 12, and the cam 12 immediately acts to force the segments 14 and 15 firmly against the engaging-portion 46 of the driven part and thereby produces a firm-engagement between engaging portions 44, 45 of the segments and the aforesaid engaging portion 46, of the driven part. After said engagement, the cam 12 cannot move further with reference to the segments 14, 15, and the segments have imparted thereto the torque of the cam 12 and driving shaft 16 and drive the driven part 11 through the firm engagement of the engaging parts 44, 45, 46, and the driving engagement through the clutch continues as long as the driving force continues to act on the cam 12. By adjustment of the screw-plugs 40 any inequality of the engagement of the portions 44, 45, of the segments with the engaging portion 46 of the driven part 11 may be corrected.

The action of the clutch in bringing about driving engagement between the driving and driven parts is hence very quick. Moreover, the engagement between the engaging portions 44, 45, 46 is a very firm one, after contact of said portions is effected, and hence a firm and positive drive through interengaging portions having cylindrical contacting portions may be effected. The slight relative movement between the cylindrical engaging portions 44, 45, 46 between the time of initial contact and the firm engagement produced by the action of cam 12, moreover provides a means of cushioning the initial shock between the driving and driven parts at the time of engagement of the clutch-parts.

Upon the decline of the driving force as by opening a switch to the electric motor 18, the cam 12 ceases to act to force the segments 14, 15, outwardly, and the firm-engagement between the engaging surfaces 44, 45, 46 ceases and the springs 56, 57 draw the segments together and the engaging portions 44, 45, 46 out of contact, and the parts of the clutch are restored to their initial position.

The invention may receive other embodiments than that herein specifically illustrated and described.

What is claimed is:

1. The combination, in a clutch of the type which operates to automatically engage and disengage the clutch parts with the starting and declining of a driving force, of a driving-part and a driven-part, said driving-part comprising oppositely arranged centrifugal segments, a spring connected to and acting in a direction to draw the segments together, interengaging faces on said driven-part and segments, and a driving cam having a limited amount of rotary movement with relation to said segments, said segments provided with projections which are adjustable toward and from the faces of said cam, and said cam arranged, when a driving force is applied to start the rotation of the cam and a torque opposite to the driving torque exists in the segments due to the inertia of the segments, to move said segments into engagement with the driven-part, and thereafter, during the continuation of the torque opposite to the driving torque due to the resistance of the driven part, to force said segments firmly into engagement with said driven-part; and said driving cam, when the driving torque declines, ceasing to force said segments into firm engagement with said driven-part, said spring thereafter acting to draw said segments together.

2. The combination, in a clutch of the type which operates to automatically engage and disengage the clutch parts with the starting and declining of a driving force, of a driving-part and a driven-part, said driving-part comprising oppositely arranged centrifugal segments, a spring connected to and acting in a direction to draw the segments together, interengaging faces on said driven-part and segments, and a driving cam having a limited amount of rotary movement with relation to said segments, said segments provided with countersunk portions, anti-friction devices mounted in and projecting from said countersinks and adjustable toward and from the faces of said cam, and said cam arranged, when a driving force is applied to start the rotation of the cam and a torque opposite to the driving torque exists in the segments due to the inertia of the segments, to move said segments into engagement with the driven-part, and thereafter, during the continuation of the torque opposite to the driving torque due to the resistance of the driven part, to force said segments firmly into engagement with said driven-part; and said driving cam, when the driving torque declines, ceasing to force said segments into firm engagement with said driven-part, said spring thereafter acting to draw said segments together.

FREDERIC W. LE PORIN.